(12) United States Patent
Bushey et al.

(10) Patent No.: US 7,724,889 B2
(45) Date of Patent: May 25, 2010

(54) SYSTEM AND METHOD FOR UTILIZING CONFIDENCE LEVELS IN AUTOMATED CALL ROUTING

(75) Inventors: Robert R. Bushey, Cedar Park, TX (US); Benjamin Anthony Knott, Round Rock, TX (US); John Mills Martin, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1163 days.

(21) Appl. No.: 10/999,199

(22) Filed: Nov. 29, 2004

(65) Prior Publication Data

US 2006/0115070 A1 Jun. 1, 2006

(51) Int. Cl.
*H04M 3/42* (2006.01)
(52) U.S. Cl. .............. 379/265.02; 370/524; 379/88.02; 379/211.02; 379/265.09; 379/266.1; 434/362; 704/5; 704/251; 709/228
(58) Field of Classification Search ............ 379/265.02, 379/0.05, 0.07, 0.08, 0.11, 0.12, 0.13, 266.08, 379/88.01–88.04, 211.02, 265.09, 266.1; 704/257, 5, 251; 370/524; 434/362; 709/228
See application file for complete search history.

(56) References Cited

U.S. PATENT DOCUMENTS

| | | | |
|---|---|---|---|
| 4,953,204 A | 8/1990 | Cuschelg, Jr. et al. | |
| 4,967,405 A | 10/1990 | Upp et al. | |
| 4,975,841 A | 12/1990 | Kehnemuyi et al. | |
| 5,297,183 A * | 3/1994 | Bareis et al. ................ | 455/410 |
| 5,299,260 A | 3/1994 | Shaio | |
| 5,335,269 A | 8/1994 | Steinlicht | |
| 5,432,845 A | 7/1995 | Burd et al. | |
| 5,455,903 A | 10/1995 | Jolissaint et al. | |
| 5,497,373 A | 3/1996 | Hulen et al. | |
| 5,522,046 A | 5/1996 | McMillen et al. | |
| 5,530,744 A | 6/1996 | Charalambous et al. | |
| 5,555,299 A | 9/1996 | Maloney et al. | |
| 5,590,186 A | 12/1996 | Liao et al. | |
| 5,621,789 A | 4/1997 | McCalmont et al. | |
| 5,652,789 A | 7/1997 | Miner | |
| 5,732,133 A | 3/1998 | Mark | |

(Continued)

FOREIGN PATENT DOCUMENTS

EP 0 424 015 A2 4/1991

(Continued)

OTHER PUBLICATIONS

U.S. Appl. No. 10/898,722, filed Jul. 23, 2004.

(Continued)

*Primary Examiner*—Gerald Gauthier
(74) *Attorney, Agent, or Firm*—Toler Law Group

(57) ABSTRACT

A call routing system prompts a caller for information and receives a response from the caller. Based on the caller's response, a confidence value is assigned to the call. The confidence value can be assigned based on the likelihood that the received information is consistent with the prompt and other criteria. Additional prompts are provided to the caller based on the confidence value, and additional caller's responses are used to modify the confidence value. At least one threshold confidence level is set and when the confidence value of the call meets or exceeds the threshold (because of low confidence), the call is immediately routed to a human operator.

26 Claims, 4 Drawing Sheets

U.S. PATENT DOCUMENTS

| | | | |
|---|---|---|---|
| 5,754,639 A | 5/1998 | Flockhart et al. | |
| 5,754,978 A | 5/1998 | Perez-Mendez et al. | |
| 5,845,062 A | 12/1998 | Branton et al. | |
| 5,867,817 A | 2/1999 | Catallo et al. | |
| 5,917,903 A * | 6/1999 | Jolissaint | 379/265.02 |
| 5,923,745 A | 7/1999 | Hurd | |
| 5,937,051 A | 8/1999 | Hurd et al. | |
| 5,940,476 A | 8/1999 | Morganstein | |
| 5,946,388 A | 8/1999 | Walker et al. | |
| 5,953,704 A | 9/1999 | McIlroy et al. | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,038,293 A | 3/2000 | McNerney et al. | |
| 6,049,594 A | 4/2000 | Furman et al. | |
| 6,118,796 A * | 9/2000 | Best et al. | 370/524 |
| 6,118,866 A | 9/2000 | Shtivelman | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 * | 7/2001 | Carpenter et al. | 379/88.02 |
| 6,317,439 B1 | 11/2001 | Cardona et al. | |
| 6,320,951 B1 | 11/2001 | Shtivelman et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,411,687 B1 * | 6/2002 | Bohacek et al. | 379/88.21 |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,496,567 B1 | 12/2002 | Bjornberg et al. | |
| 6,496,836 B1 | 12/2002 | Ronchi et al. | |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,553,112 B2 | 4/2003 | Ishikawa | |
| 6,553,113 B1 | 4/2003 | Dhir et al. | |
| 6,560,329 B1 * | 5/2003 | Draginich et al. | 379/265.02 |
| 6,570,967 B2 | 5/2003 | Katz | |
| 6,574,599 B1 | 6/2003 | Lim et al. | |
| 6,577,718 B1 | 6/2003 | Kalmanek et al. | |
| 6,584,180 B2 | 6/2003 | Nemoto | |
| 6,584,191 B1 | 6/2003 | McPartlan et al. | |
| 6,587,556 B1 | 7/2003 | Judkins et al. | |
| 6,587,558 B2 | 7/2003 | Lo | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliott et al. | |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,458 B1 | 2/2004 | Kunjibettu | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,751,591 B1 * | 6/2004 | Gorin et al. | 704/257 |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,801,751 B1 * | 10/2004 | Wood et al. | 434/362 |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,847,715 B1 | 1/2005 | Swartz | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,925,432 B2 * | 8/2005 | Lee et al. | 704/5 |
| 6,963,983 B2 | 11/2005 | Munson et al. | |
| 6,970,554 B1 * | 11/2005 | Peterson et al. | 379/266.1 |
| 7,006,605 B1 | 2/2006 | Morganstein | |
| 7,031,444 B2 | 4/2006 | Shen et al. | |
| 7,035,388 B2 | 4/2006 | Kurosaki | |
| 7,124,059 B2 | 10/2006 | Wetzer et al. | |
| 7,133,828 B2 * | 11/2006 | Scarano et al. | 704/251 |
| 7,206,400 B2 | 4/2007 | Dezonno et al. | |
| 7,245,716 B2 | 7/2007 | Brown et al. | |
| 7,454,005 B2 * | 11/2008 | Malik | 379/211.02 |
| 7,602,899 B1 * | 10/2009 | Thenthiruperai | 379/265.02 |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032075 A1 | 10/2001 | Yamamoto | |
| 2001/0032229 A1 | 10/2001 | Hulls et al. | |
| 2001/0034662 A1 | 10/2001 | Morris | |
| 2002/0046030 A1 | 4/2002 | Haritsa | |
| 2002/0055975 A1 | 5/2002 | Petrovykh | |
| 2002/0057678 A1 | 5/2002 | Jiang et al. | |
| 2002/0059164 A1 | 5/2002 | Shtivelman | |
| 2002/0059169 A1 | 5/2002 | Quaterman et al. | |
| 2002/0067714 A1 | 6/2002 | Crain et al. | |
| 2002/0087316 A1 | 7/2002 | Lee et al. | |
| 2002/0087385 A1 | 7/2002 | Vincent | |
| 2002/0087558 A1 | 7/2002 | Bailey et al. | |
| 2002/0114432 A1 | 8/2002 | Shaffer et al. | |
| 2002/0122544 A1 | 9/2002 | Williams et al. | |
| 2002/0133394 A1 | 9/2002 | Bushey et al. | |
| 2002/0133413 A1 | 9/2002 | Chang et al. | |
| 2002/0135618 A1 | 9/2002 | Maes | |
| 2002/0156699 A1 | 10/2002 | Gray et al. | |
| 2002/0165732 A1 | 11/2002 | Ezzeddine et al. | |
| 2002/0169606 A1 | 11/2002 | Bantz et al. | |
| 2002/0196277 A1 | 12/2002 | Bushey et al. | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |

| | | |
|---|---|---|
| 2003/0114105 A1 | 6/2003 | Haller et al. |
| 2003/0118159 A1 | 6/2003 | Shen et al. |
| 2003/0130841 A1 | 7/2003 | Bangalore et al. |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0179876 A1 | 9/2003 | Fox et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0228007 A1 | 12/2003 | Kurosaki |
| 2003/0235287 A1 | 12/2003 | Margolis et al. |
| 2004/0005047 A1 | 1/2004 | Joseph et al. |
| 2004/0006473 A1 | 1/2004 | Mills et al. |
| 2004/0028213 A1* | 2/2004 | Goss .................... 379/265.09 |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083206 A1 | 4/2004 | Wu et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0018825 A1 | 1/2005 | Ho |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0060200 A1 | 3/2005 | Kobylevsky et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0169441 A1 | 8/2005 | Yacoub |
| 2005/0169453 A1 | 8/2005 | Knott et al. |
| 2005/0201547 A1 | 9/2005 | Burg et al. |
| 2005/0210143 A1* | 9/2005 | Wengrovitz .................. 709/228 |
| 2005/0240411 A1 | 10/2005 | Yacoub |
| 2006/0072737 A1 | 4/2006 | Paden et al. |
| 2006/0109976 A1 | 5/2006 | Sundaram et al. |
| 2006/0177040 A1 | 8/2006 | Mitra |
| 2006/0256952 A1* | 11/2006 | Rogers et al. .......... 379/265.02 |
| 2006/0256956 A1 | 11/2006 | Lee et al. |
| 2006/0291642 A1 | 12/2006 | Bushey et al. |
| 2007/0041551 A1 | 2/2007 | Whitecotten et al. |
| 2007/0047720 A1 | 3/2007 | Brandt et al. |
| 2007/0116230 A1 | 5/2007 | Brandt et al. |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/975,023, filed Oct. 27, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.
Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

* cited by examiner

SYSTEM AND METHOD FOR UTILIZING CONFIDENCE LEVELS IN AUTOMATED CALL ROUTING

FIELD OF THE DISCLOSURE

The present disclosure relates generally to menu driven user interfaces and, more particularly, to speech recognition enabled automatic call routing service systems.

BACKGROUND

Developments in speech recognition technologies support "natural language" type interactions between automated systems and customers. A natural language interaction allows a customer to speak naturally, and a voice recognition system can react in response to the customer's request. One of the applications of natural language is in speech recognition with automatic call routing (ACR). A goal of an ACR application is to determine why a customer is calling a service center and to route the customer to an appropriate human operator or destination system for servicing a customer request. Speech recognition technology generally allows an ACR application to recognize natural language statements so that the application does not have to rely on a menu system. This allows the customer to state the purpose of their call "in their own words."

In order for an ACR application to properly route calls, the ACR system attempts to interpret the intent of the customer call, identify the intent of the customer call, and then identify a correct routing destination. Identification of all possible caller requests is a time intensive and extensive phase of development because all call types are typically not known prior to ACR application development.

One significant problem that occurs in ACR systems is that speech recognition systems cannot understand all callers all of the time. When the speech recognition system partially understands or misunderstands the callers' goals, significant problems can result. Further, even in touch-tone ACR systems the caller can depress the wrong buttons and get routed to a wrong location. When a caller gets routed to an unintended destination, the caller often hangs up and retries the call. Another common problem occurs when a caller gets "caught" or "trapped" in a menu that does not provide an acceptable selection to exit the menu. Trapping a caller leads to an abandoned call. A huge volume of calls is often handled by a call routing system and even if a small percentage of calls are abandoned, the costs associated with abandoned calls are significant.

In addition, unsuccessful call routing results in caller dissatisfaction. Accordingly, there is a need for an improved method and system of routing calls.

DETAILED DESCRIPTION OF THE DRAWINGS

A system and method for achieving improved automated call routing is disclosed. A call routing system prompts a caller for information and receives a response from the caller. Based on the caller's response, a confidence value is assigned to the call. The confidence value can be assigned based on the likelihood that the received information is consistent with the prompt and other criteria. Additional prompts are provided to the caller based on the confidence value, and additional caller responses are used to modify the confidence value. At least one threshold level is set and when the confidence value of the call meets or falls below the threshold (because of low confidence), the call is immediately routed to a human operator. Confidence values for different responses and different thresholds can be modified to enhance performance. An automatic call routing system can include a receiver-transmitter configured to receive a call, an audio module to provide prompts, a microprocessor, and a switch to route the call. The microprocessor can recognize caller input, assign confidence values to the received input, and compare the threshold level to the confidence values. If the microprocessor determines that the confidence level is too low, the microprocessor can control a switch and route the call to a human operator.

Figure 1:
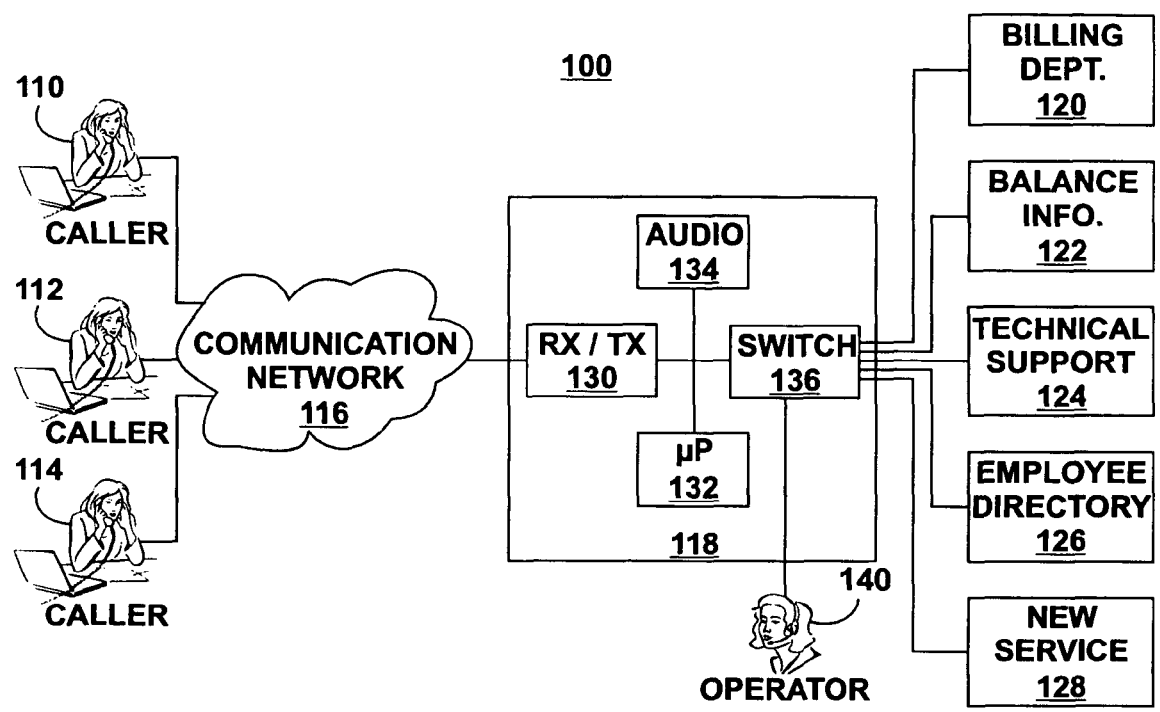
FIG. 1 illustrates a simplified configuration of a telecommunication system having a call routing system.

Referring to FIG. 1, an illustrated system 100 that provides call center support is depicted. The system 100 includes a communication network 116, a call support center 118, such as an interactive voice response system, and a plurality of potential call destinations 120-128. Illustrative call destinations include a billing department 120, a balance information department 122, a technical support department 124, an employee directory 126, new customer service 128 and human operator 140. The communication network 116 receives calls from a variety of callers, such as the illustrated callers 110, 112, and 114. In a particular embodiment, the communication network 116 may be a public telephone network or may be provided by a voice over Internet protocol (VoIP) type network. The call support center 118 includes many components such as a transceiver 130, an audio decoder 134, a microprocessor 132, and a switch 136. The call support center 118 is coupled to and may route calls to any of the call destinations as shown. In addition, the call support center 118, via switch 136, may route calls to a human operator, such as the illustrated live human operator 140. An illustrative embodiment of the call support center 118 may be a call center having a plurality of attached human operator terminals (not shown). Thus, while only a single human operator 140 is shown, it should be understood that a plurality of different human operator terminals or types of terminals may be coupled to the call support center 118, such that a variety of human operators may service incoming calls.

In operation, callers 110-114 in need of customer support place calls and the transceiver 130 is configured to receive the calls. Upon receiving a call, the microprocessor 132 instructs audio module 134 to generate a voice prompt. In one embodiment audio module 134 sends a digital voice to transceiver 130, which prompts the caller for the purpose of the call, such as by stating, "How may I help you." A caller could respond "I need to pay my bill." Microprocessor 132 can interpret the intent or purpose of the call and assign a confidence value to the call based on a set of rules. If the confidence value assigned to the call is sufficient, then the microprocessor 132 will instruct switch 136 to route the call to billing department 120. If the confidence level assigned is not sufficient, then the microprocessor 132 will instruct switch 136 to route the caller to human operator 140.

Figure 2:
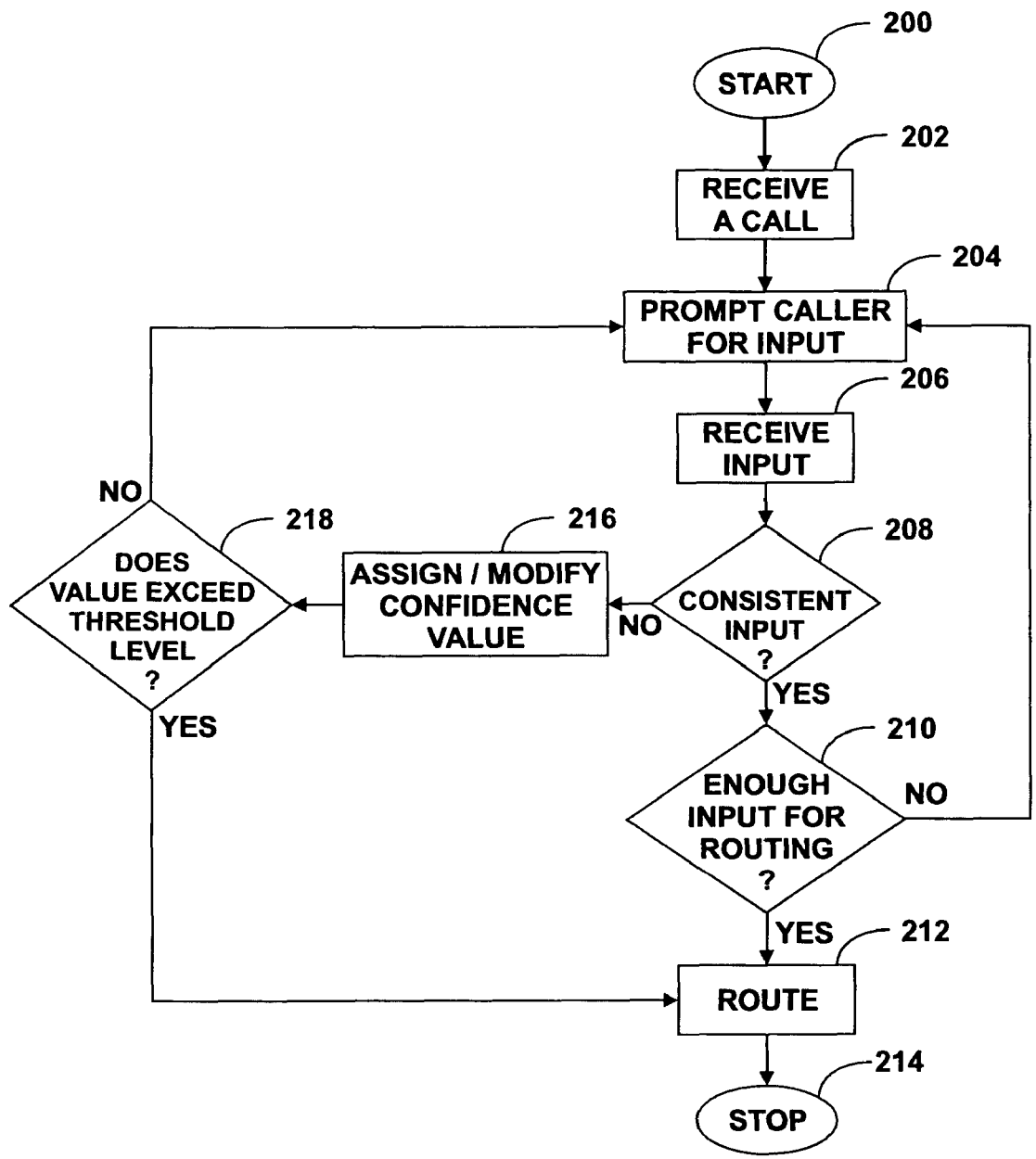
FIG. 2 is a flow diagram that illustrates a method of operation of the system of FIG. 1.

Referring to FIG. 2, a method of operation with respect to the system 100 of FIG. 1 is illustrated. The method of operation starts at step 200 and proceeds to step 202 where a call is received by the system. Next, the caller is prompted for input as shown at step 204. In response to the caller prompt, a caller provides an input that is received at step 206, and the input from the caller is evaluated at decision step 208. If the input from the caller, namely the response to the prompt, is determined to be consistent (i.e., consistent with the expected response and likely to successfully route the call), then processing is directed to decision step 210. At step 210, the response input from the caller is evaluated with respect to a routing decision. If the response input from the caller provides information suitable for making a routing determination to a call destination, then processing continues at step 212 and the call is routed to the selected call destination. An example of a call routing destination is one or more of the various departments illustrated in FIG. 1, such as the billing department 120 or the technical support department 124.

In the event that the received input at decision step 210 does not provide enough information to route the call, then processing continues back at the call request step 204 and additional information is requested from the caller. Returning to decision step 208, if the information collected from the caller response is determined as not consistent with the prompted request, or unlikely to provide successful routing, then processing continues at step 216 where a confidence value is assigned to the call or the confidence value is modified based on inconsistent caller input. At decision step 218, it is determined if the confidence value meets a threshold value. The threshold value generally relates to the probability that the call can be successfully routed based on past interactions.

After the call confidence value is assigned, decremented, or accrued, processing continues at decision step 218 where the confidence value is compared to the threshold level. If the confidence value is still high, indicating that the call can still be routed without undue caller frustration, then the process returns to step 204 where the caller is re-prompted for additional information pertinent to routing the call. If the confidence value is so low that a caller confidence is determined to be unacceptably low (i.e., below the threshold), then the call is routed, at 212, to a human operator 140 and the process ends at step 214.

In one embodiment, incoming calls accumulate a confidence value at step 216 based on different caller responses, or non-responses, which have different degrees of confidence (different confidence values) associated with them. When an event or a series of events provide a confidence value or a cumulative confidence value that meets or exceeds the threshold level, then the auto-routing process switches the caller to a human operator. In other embodiments the call confidence level may be decremented depending on the magnitude of the call response inconsistency. The reduction in a confidence value may vary depending on the type of input received from a caller or the relative position in the call flow where the caller input was requested. Many mathematical formulas could be utilized to gauge caller success or confidence without departing from the scope of the present invention. With the disclosed system and method, the caller beneficially avoids being caught in a negative situation, such as a loop of continued automated responses where the caller moves aimlessly through menus and never reaches a human operator. For example, in a particular embodiment, the caller may receive one or two and possibly three negative events leading to low confidence levels and then the caller is routed to a human operator. With prior systems, the same call flow could require a user to experience multiple negative events (as many as 8), before being routed to a human operator. Thus, the disclosed method disposes of calls quicker, provides an enhanced customer experience, and provides a preferred service for those calls where the caller has a negative interaction with the automated call support system. An increased level of customer satisfaction is thereby realized. Further details regarding a particular embodiment of a method of determining confidence values and making threshold comparisons is described further in reference to FIGS. 3A and 3B.

Figure 3A:
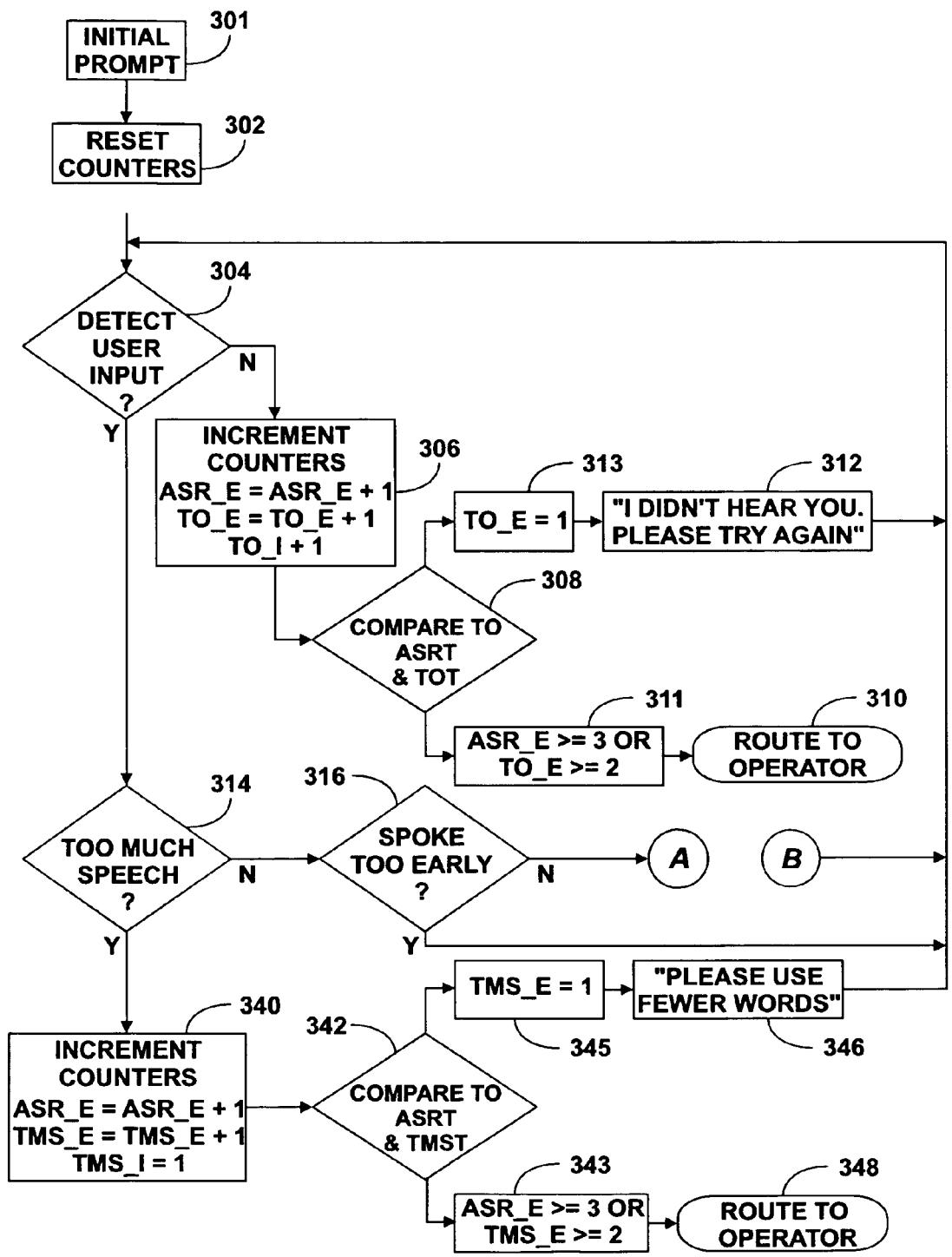
FIGS. 3A and 3B are flow diagrams that illustrate a particular embodiment of a call routing method.

Referring to FIG. 3A, an embodiment of a method of processing a call and determining confidence values for call support levels is illustrated. An initial prompt to a caller is provided, at step 301, and a set of counters are initialized or reset at step 302. A caller response to the prompt is received and recognized and caller input is detected at 304. Next, as depicted at step 314, the caller input is evaluated for too much speech. If the caller input includes too much speech, such as a speech input exceeding a certain amount of time or number of recognizable phonemes, then processing continues at 340. At processing step 340, two cumulative error counters are incremented. The cumulative error counters represent one way in which confidence values can be assigned to the call.

Figure 3B:
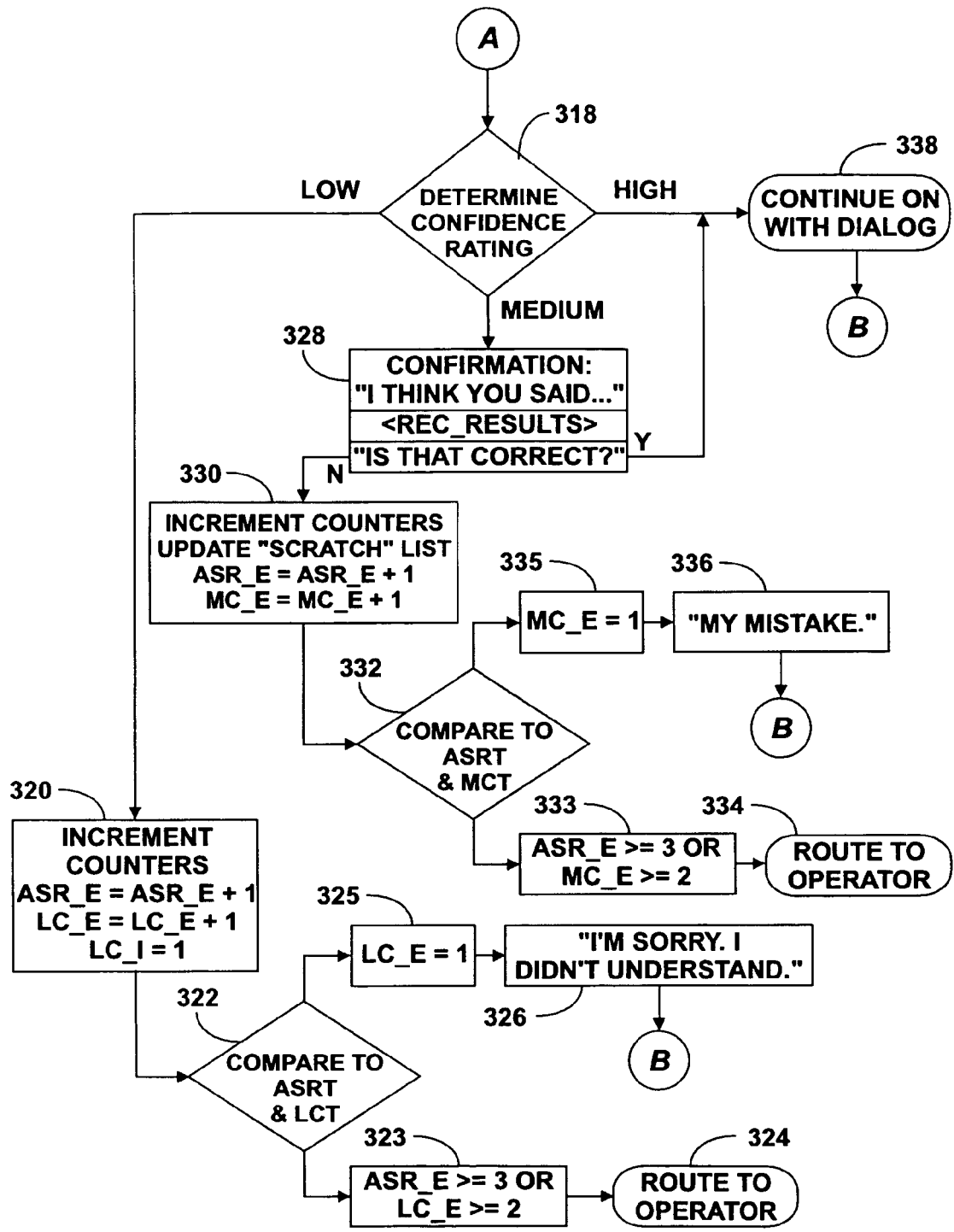

In the method of FIGS. 3A and 3B each inconsistency in the process, increments a global cumulative error counter and an event-specific counter. For example, at step 340 global counter ACR is incremented and the TMS (too much speech) counter is also incremented in response to a caller input of too much speech. The global cumulative error counter (ASR) is incremented responsive to many different inconsistencies wherein a too much speech counter (TMS) is incremented when too much speech is detected. The result of processing step 340 is an increment to the ASR and the TMS counter based on the determination of too much speech. Processing continues at decision step 342, where the number of inconsistencies is analyzed by comparing counter status with two threshold values ASRT and TMST (cumulative speech threshold and too much speech threshold). If the number of inconsistencies is one, being a first event, as shown at 345, then an additional voice prompt is made at 346, such as the prompt, "Please use fewer words." Referring back to step 342, in the event that the number of TMS retries is 2 or greater, or 3 cumulative errors have occurred as shown by block 343, then the process proceeds to step 348 because the confidence level has become too low. In this case, the maximum TMS count or ASR count has been exceeded, and the call would be routed directly to a human operator for further handling as depicted by block 348.

Referring back to decision step 314, where a determination is made that the caller response does not contain too much speech, then it is determined whether the response was spoken too early, as shown at step 316. Where the caller provided a response too early (before the system was ready), then processing is redirected back to detect user input at step 304. Where the response from the caller at step 316 is not spoken too early, then a confidence rating is evaluated at decision step 318 of FIG. 3B.

Referring to FIG. 3B, where the confidence rating of the response is determined to be a high confidence value, then processing is forwarded to step 338, and a dialogue with the caller is continued according to normal call support processing. New user input is detected at step 304. Where the confidence rating, at decision step 318, is determined to be a medium rating, then as illustrated by step 328 a voice prompt is initiated, such as the illustrated prompt, "I think you said," followed by a computer filled-in version of what the system thinks the caller said. The system also provides a follow-up voice prompt such as, "Is that correct?" This voice prompting is illustrative of how the interactive voice response system may solicit further information and boost or modify a confidence level in a caller response or request. At this stage after the confirmation step 328, processing continues with step 338 and the dialogue with the caller continues and user input is again solicited at step 304.

Referring again to step 328, where a second response from the caller indicates that the system did not correctly interpret the first caller response, then processing is forwarded to step 330, where a scratch list is updated. The scratch list makes known incorrect conclusions that have been rejected by the caller. In this step, the ASR counter is incremented and the medium confidence error (MC) counter is also incremented. Both of these actions provide a reduced confidence value for the subject call. Processing then continues to decision step 332, where the MC counter value and the ASR counter value are compared to ASRT and MCT, or the pertinent threshold values. When the medium confidence level is equal to 1, or when the first medium confidence level event is detected, at step 336, the system provides a prompt, "My mistake," and attempts to collect additional caller input, at step 304. Where the MC counter value exceeds the medium confidence threshold, (set to 2 in FIG. 3B) or ASR exceeds the ASRT (set to 3 in FIG. 3B), as illustrated at step 333, then a confidence threshold value or a medium confidence threshold value has been exceeded and the call is routed to a human operator for further support as indicated at step 334.

Returning to decision step 318, where a low confidence rating determination is made based on an evaluation of the caller input, processing is directed to step 320, where the ASR counter and a low confidence error counter (LC) is incremented. Processing then continues to decision step 322 where the LC counter and the ASR error counter values are compared to thresholds ASRT and low confidence threshold (LCT). For an initial low confidence event, where the low confidence counter equals 1, as depicted by block 325, the call response system provides an additional prompt, such as, "I'm sorry, I didn't understand." In this scenario at 326, a retry prompt is made and additional caller input is collected. In the event that the ASR counter or the LC counter exceeds one of the threshold values as shown at block 323, then a low confidence transfer condition is detected at 324 and the call is routed to a human operator for further processing. In certain embodiments, the confidence value can also consider external criteria such as caller location and past calls from a caller.

Returning to recognition state 304 of FIG. 3A, where a timeout condition is detected due to no user input being received in an appropriate time window, processing proceeds to step 306 where ASR counter and a timeout counter (TO) are both incremented. Upon incrementing the ASR counter and the TO counter, the counter values are compared to the threshold values ASRT and TOT, at decision step 308. Where an initial timeout event is indicated, TO=1, by block 313 a timeout prompt such as, "I did not hear you please speak again" is initiated to the caller, at 312, and the method proceeds to step 304 to accept additional input. However, where the ASR counter has exceeded a threshold value or where the TO counter has exceeded a threshold value ASRT and TOT as shown at 311, then a timeout transfer condition has been detected, and the call is routed to a human operator for live interaction.

The disclosed system and method allows tracking of related human behaviors and may take appropriate actions in various circumstances. The disclosed system and method is applicable to multiple user interface modalities, and can process caller or user input from interactive systems such as websites, touchtone phones, speech recognition systems, and other user interface systems. The disclosed system and method provides improved caller satisfaction, since the user beneficially avoids being caught in error-prone situations and frustrating endless loops of automated systems. In addition, the disclosed system and method leads to a reduced level of abandoned calls (i.e., caller hangs up prior to completing their task), thereby reducing provider system costs (e.g., lower port costs and fewer repeat calls).

Some inconsistencies in processing caller inputs are more frustrating to callers than others. In the embodiment of FIGS. 3A and 3B, multiple confidence threshold levels are created and monitored where each counter is incremented by 1 when an inconsistency occurs. However the counters could be incremented by fractional values or varying values according to the severity of the inconsistency. Assigning different values could be described as weighting the inconsistencies in response to a perceived inadequacy or misunderstanding of the input.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving a call at a call support system;
   requesting caller information;
   receiving a first response;
   incrementing an error counter when the first response is inconsistent with the requested caller information;
   incrementing an event-specific counter based on a type of the inconsistency of the first response, the type of the inconsistency including at least a too much speech inconsistency;
   routing the call to a human operator when the event-specific counter exceeds an event-specific threshold;
   assigning a confidence value to the call based on the first response and the caller information;
   comparing the confidence value to a threshold level; and
   routing the call to the human operator when the confidence value exceeds the threshold level.

2. The method of claim 1, further comprising:
   assigning confidence values to a call support event based upon the type of the inconsistency of the first response.

3. The method of claim 2, further comprising:
   combining the confidence values to produce a modified confidence value;
   comparing the modified confidence value to the threshold level; and
   routing the call to the human operator when the modified confidence value exceeds the threshold level.

4. The method of claim 1, further comprising prompting a caller for a second response.

5. The method of claim 4, further comprising modifying the confidence value based on the second response.

6. The method of claim 1, further comprising using a counter to modify the confidence value.

7. The method of claim 6, further comprising incrementing the counter based on the first response.

8. The method of claim 6, wherein a plurality of counters provide a plurality of confidence values.

9. The method of claim 4, wherein a recorded voice is used to prompt the caller.

10. The method of claim 1, wherein the first response is a touch tone response.

11. The method of claim 1, wherein the first response is a voice response.

12. The method of claim 2, wherein the type of the inconsistency further includes at least one of a time out inconsistency, an unintelligibility inconsistency, and a spoken too early inconsistency.

13. A voice activated call routing system comprising:
a transceiver configured to receive a call;
an audio module coupled to the transceiver, the audio module to prompt a caller for a first response;
a processor coupled to the transceiver, the processor to assign a confidence value to the call based on an evaluation of the first response, the processor including logic to compare the confidence value to a threshold level, to increment an error counter when the first response is inconsistent with the prompt, and to increment an event-specific counter based on a type of the inconsistency of the first response, the type of the inconsistency including at least a too much speech inconsistency; and
a switch coupled to the processor, the switch to route the call to a human operator when the confidence value does not meet the threshold level and to route the call to the human operator when the event-specific counter exceeds an event-specific threshold.

14. The voice activated call routing system of claim 13, wherein the processor assigns the confidence value to a call support event based upon the type of the inconsistency of the first response.

15. The voice activated call routing system of claim 13, wherein the processor combines the multiple confidence values to produce a modified confidence value and compares the modified confidence value to the threshold level and wherein the switch routes the call to a human operator when the modified confidence value fails to meet the threshold level.

16. The voice activated call routing system of claim 13, wherein the audio module prompts the caller for a second response.

17. The voice activated call routing system of claim 13, wherein the audio module prompts the caller for a second response and wherein the processor modifies the confidence value based on the second response.

18. The voice activated call routing system of claim 14, further comprising a counter to count event inconsistencies.

19. The voice activated call routing system of claim 14, further comprising a plurality of counters configured to count a plurality of inconsistencies.

20. The voice activated call routing system of claim 13, wherein prompting is performed by a recorded voice.

21. The voice activated call routing system of claim 13, wherein the first response is a voice response.

22. A method of processing user input comprising:
requesting caller information from a user at an interactive system;
processing a first user response;
incrementing an error counter when the first user response is inconsistent with the requested caller information;
incrementing an event-specific counter based on a type of the inconsistency of the first user response, the type of the inconsistency including at least a too much speech inconsistency;
routing a call to a human operator when the event-specific counter exceeds a first event-specific threshold;
assigning a confidence value to the request based on the first user response;
prompting the user for a second response when the event-specific counter exceeds a second event-specific threshold;
processing the second response and modifying the confidence value based on the second response;
comparing the confidence value with a threshold confidence level; and
routing the call to the human operator when the confidence value is below the threshold confidence level.

23. The method of claim 22, further comprising continuing interaction with the user when the confidence level is above the threshold confidence level.

24. The method of claim 22, wherein assigning the confidence value to the request based on the first user response further comprises assigning a confidence value to the call based on a magnitude of the inconsistency.

25. The method of claim 22, wherein the confidence value is assigned based on a likelihood that the first user response is valid.

26. The method of claim 24, where the type of inconsistency further includes at least one of a time out inconsistency, an unintelligibility inconsistency, and a spoke too early inconsistency.

* * * * *